US011887516B2

(12) United States Patent
Kim et al.

(10) Patent No.: US 11,887,516 B2
(45) Date of Patent: Jan. 30, 2024

(54) DISPLAY DRIVER HAVING OUTPUT CORRECTION FUNCTION

(71) Applicant: LX Semicon Co., Ltd., Daejeon (KR)

(72) Inventors: Byeong Yong Kim, Daejeon (KR); Chang Bae Lee, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 17/820,841

(22) Filed: Aug. 18, 2022

(65) Prior Publication Data

US 2023/0057575 A1 Feb. 23, 2023

(30) Foreign Application Priority Data

Aug. 19, 2021 (KR) ........................ 10-2021-0109728
Jul. 22, 2022 (KR) ........................ 10-2022-0091177

(51) Int. Cl.
*G09G 3/00* (2006.01)

(52) U.S. Cl.
CPC ..... *G09G 3/006* (2013.01); *G09G 2310/0291* (2013.01); *G09G 2330/12* (2013.01)

(58) Field of Classification Search
CPC .............................................. G09G 2310/0291
See application file for complete search history.

(56) References Cited

U.S. PATENT DOCUMENTS

2020/0143728 A1* 5/2020 Lee .......................... G09G 3/20

* cited by examiner

*Primary Examiner* — Nan-Ying Yang
(74) *Attorney, Agent, or Firm* — POLSINELLI PC

(57) ABSTRACT

Various embodiments disclose a display driver, wherein the display driver may be configured to detect a defective output buffer among output buffers and perform an output correction function for the defective output buffer.

6 Claims, 10 Drawing Sheets

DISPLAY DRIVER HAVING OUTPUT CORRECTION FUNCTION

BACKGROUND

1. Technical Field

Various embodiments generally relate to a display driver, and more particularly, to a display driver having an output correction function capable of actively responding to failure of an output buffer for outputting a source signal.

2. Related Art

A display panel for displaying a screen may be implemented using an LCD panel or an OLED panel. The display panel may be configured to display a screen according to a source signal provided from a display driver.

The display driver may be configured to output an output signal corresponding to display data through a plurality of channels, and an output buffer may be configured for each channel. The output buffer may be configured to receive an input signal corresponding to display data and provide a source signal corresponding to the input signal as an output signal.

The display driver may be released after confirming the normal operation of the output buffers for the channels. However, during use, the output buffer may be defective for various reasons. A defect in the output buffer may cause a display malfunction such as a line dim forming an abnormal column line.

Therefore, there is a need to develop a display driver capable of resolving a display from malfunctioning due to a defect in an output buffer that may occur during use.

SUMMARY

Various embodiments provide a display driver having an output correction function capable of resolving display failure caused by a defect in an output buffer.

In an embodiment, a display driver may include: an output buffer configured to output a source signal corresponding to an input signal; a dummy buffer configured to output a dummy source signal corresponding to the input signal; a detection circuit configured to provide a control signal by detecting a state of the source signal; and a switching circuit configured to select one of the source signal and the dummy source signal according to the control signal and output a selected signal as an output signal.

In an embodiment, a display driver may include a first output buffer configured to output a first source signal corresponding to a first input signal; a second output buffer configured to output a second source signal corresponding to a second input signal; a first detection circuit configured to provide a first control signal by detecting a state of the first source signal; and a first switching circuit configured to select one of the first and second source signals according to the first control signal and output a selected signal as a first output signal corresponding to the first output buffer.

In an embodiment, a display driver may include first output buffers constituting a first group to output first source signals corresponding to first input signals; second output buffers constituting a second group, wherein the number of the second output buffers is equal to the number of the first output buffers and the second output buffers output second source signals corresponding to second input signals; a first detection circuit configured to provide a first control signal by detecting states of the first source signals; and a first switching circuit configured to select one group of the first group and the second group according to the first control signal and output source signals of the selected group as first output signals corresponding to the first output buffers.

According to the embodiments, by using the dummy buffer instead of the defective output buffer to output the source signal, it is possible to resolve the display failure due to the failure of the output buffer.

In addition, according to the embodiments, by using the adjacent output buffer instead of the defective output buffer to output the source signal, it is possible to resolve the display failure due to the failure of the output buffer.

In addition, according to the embodiments, by using a group of adjacent output buffers instead of a group of defective output buffers to output the source signal, it is possible to resolve the display failure due to the failure of the output buffer.

Therefore, according to the embodiments, it is possible to improve the reliability of a display driver and a display system using the same.

DETAILED DESCRIPTION

According to various embodiments, there is provided a display driver capable of resolving display failure due to an output of a defective output buffer.

Figure 1:
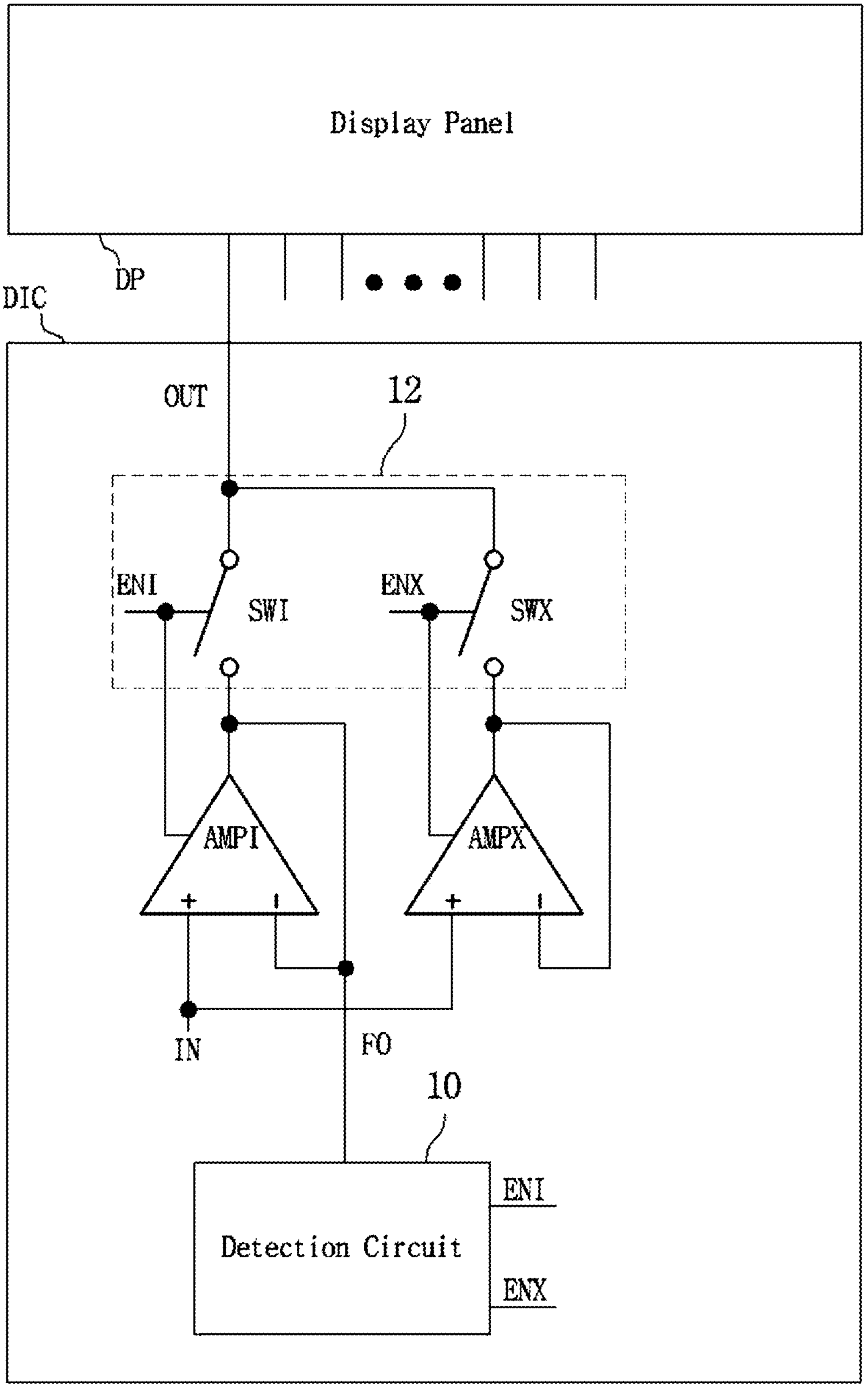
FIG. 1 is a block diagram illustrating a display driver having an output correction function in accordance with an embodiment.

To this end, as shown in FIG. 1, a display driver DIC may be implemented to resolve the failure of an output buffer AMPI by using a dummy buffer AMPX.

Referring to FIG. 1, the display driver DIC may have a plurality of channels for providing output signals OUT to a display panel DP, and may include the output buffer AMPI and the dummy buffer AMPX for each channel.

For description of an embodiment, the display driver DIC in FIG. 1 is exemplarily configured to provide an output signal OUT of one channel.

The display driver DIC may include latches (not shown), a level shifter (not shown), a digital-to-analog converter (not shown), and the like in order to convert display data (not shown) for each channel to an input signal IN which is an analog signal. Since the conversion of the display data to the input signal IN corresponds to a general technique, the detailed description will be omitted.

The output buffer AMPI and the dummy buffer AMPX are configured to receive the same input signal IN. The output buffer AMPI and the dummy buffer AMPX are each configured to output a signal obtained by comparing the input signal IN applied to the positive terminal (+) with the signal which is the output fed back and applied to the negative terminal (−).

It may be defined that the output buffer AMPI outputs a source signal corresponding to the input signal IN, and the dummy buffer AMPX outputs a dummy source signal corresponding to the input signal IN. The output buffer AMPI and the dummy buffer AMPX may be configured to have the same gain. Therefore, when the output buffer AMPI operates normally, it may be understood that the source signal of the output buffer AMPI and the dummy source signal of the dummy buffer AMPX are the same.

FIG. 1 shows a detection circuit 10 and a switching circuit 12.

The detection circuit 10 may be configured to provide a control signal by detecting the state of the source signal of the output buffer AMPI, and the control signal may include a switching signal ENI and a switching signal ENX.

The switching circuit 12 is configured to select one of the source signal of the output buffer AMPI and the dummy source signal of the dummy buffer AMPX by the control signal and output it as an output signal. To this end, the switching circuit 12 may include a switch SWI and a switch SWX. Among them, the switch SWI is switched by a switching signal ENI to output the source signal of the output buffer AMPI as the output signal, and the switch SWX is switched by the switching signal ENX to output the dummy source signal of the dummy buffer AMPX as the output signal.

As described above, the detection circuit 10 detects whether the source signal output from the output buffer AMPI is normally output in the first frame in which the output of the source signal is activated, that is, in the test frame, to detect whether the output buffer AMPI is out of order.

For failure detection, the output buffer AMPI may receive an input signal IN in which a level transition occurs in a test frame and output a source signal corresponding to the input signal IN. In more detail, the input signal IN may be provided to have a waveform which is maintained at a high level for a predetermined time period at the beginning of a test frame period and then transitioned to a low level. In this case, the dummy buffer AMPX may also receive the input signal IN and output a dummy source signal corresponding to the input signal IN.

The detection circuit 10 may detect whether the output buffer AMPI is out of order based on the source signal FO of the output buffer AMPI.

To this end, the detection circuit 10 may receive the source signal FO of the output buffer AMPI. When a level transition corresponding to the level transition of the input signal IN is in the source signal FO, the detection circuit 10 may provide a control signal for selecting the source signal FO. When the level transition is not in the source signal FO, the detection circuit 10 may provide a control signal for selecting the dummy source signal of the dummy buffer AMPX.

The detailed configurations and operations of the detection circuit 10 and the switching circuit 12 mentioned above will be described with reference to FIGS. 2 to 4.

Figure 3:
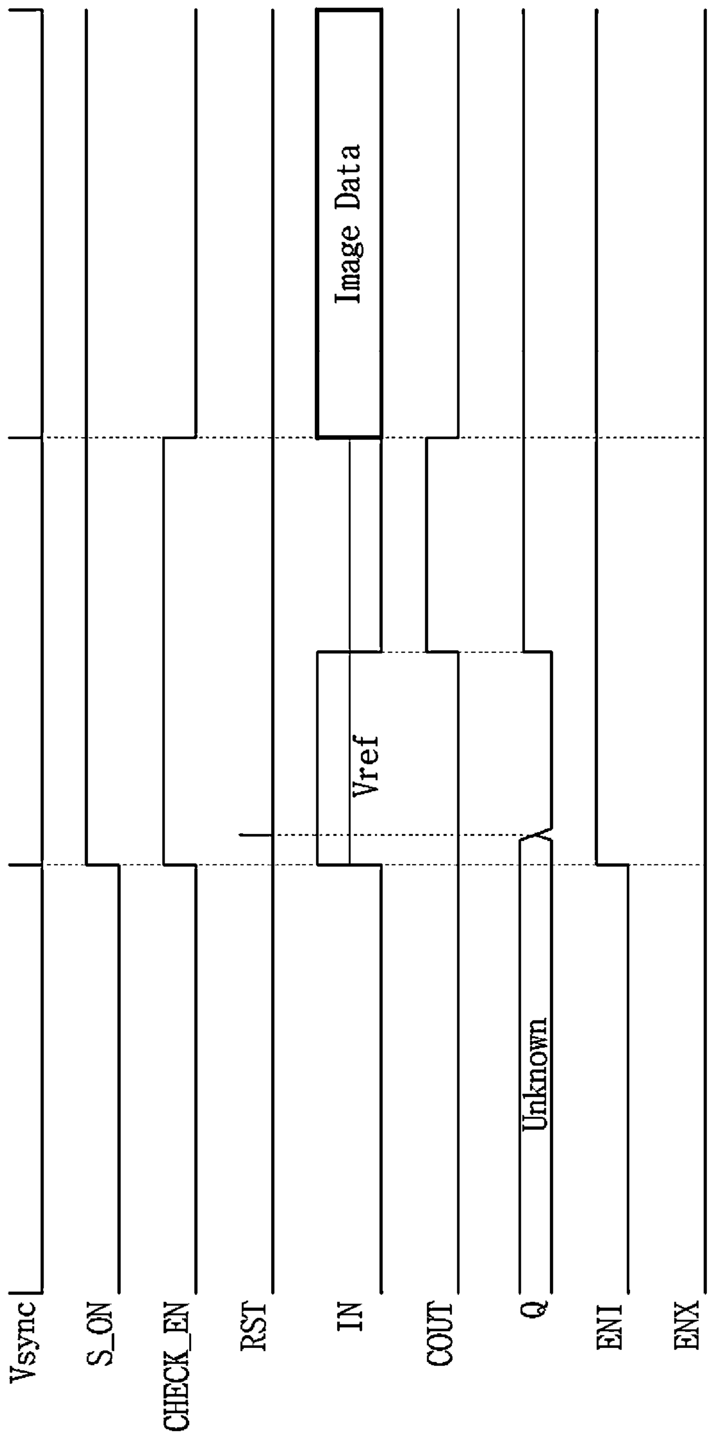
FIG. 3 is a timing chart illustrating an operation corresponding to a test frame when the output buffer of FIG. 1 is normal.
Figure 4:
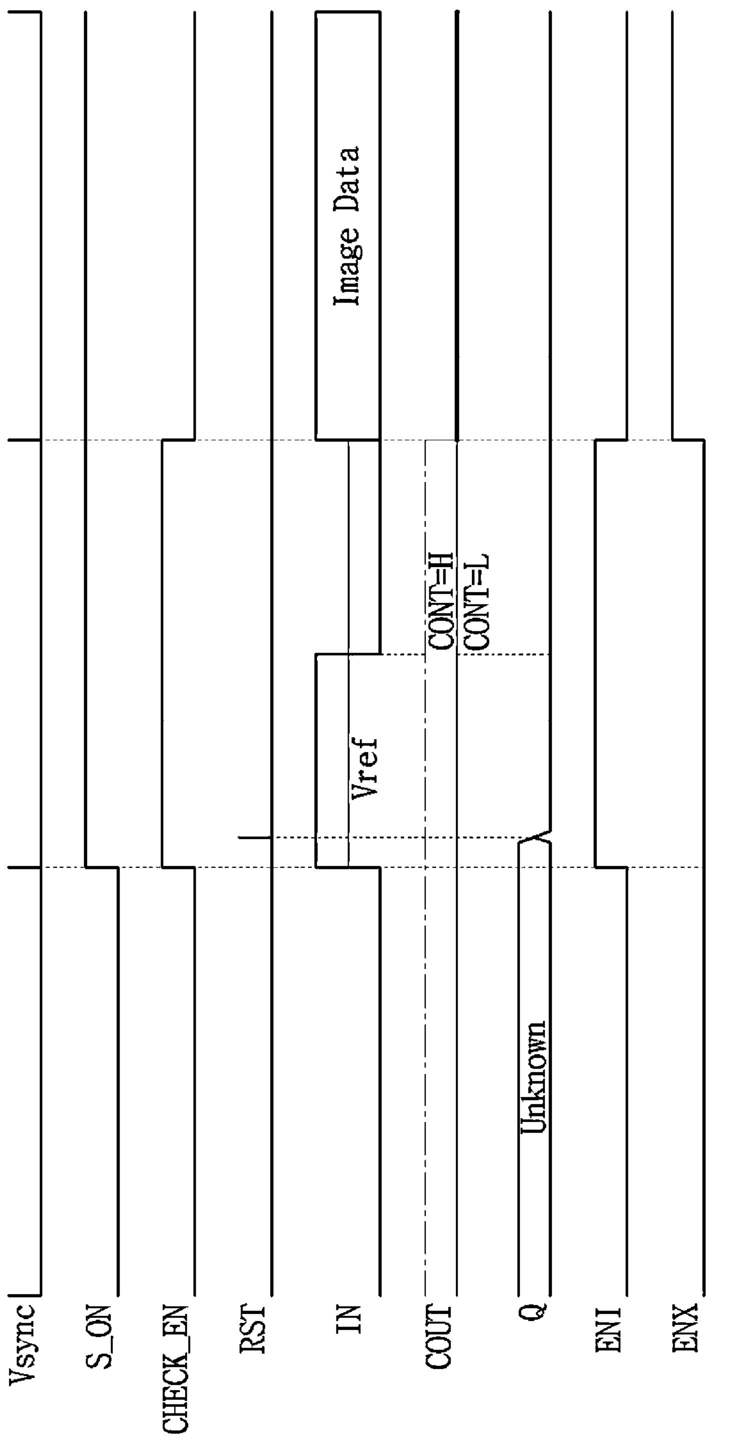
FIG. 4 is a timing chart illustrating an operation corresponding to a test frame when the output buffer of FIG. 1 is out of order.

As shown in FIGS. 3 and 4, in general, a vertical synchronization signal Vsync may be used for frame classification, and the vertical synchronization signal Vsync may be output in the form of a pulse in units of frames. Among sequentially continuous frames, for example, the first frame in which the output of the source signal is activated may be used as a test frame.

A source enable signal S_ON may be provided to activate the output buffer AMPI. The source enable signal S_ON may be activated to a high level from a test frame, and may be maintained in an activated state during a time period in which frames are continuous.

According to an embodiment, a check signal CHECK_EN may be used, which is activated to a high level during a test frame and deactivated for the remaining frames to check failure of the output buffer AMPI. That is, the check signal CHECK_EN may transition from a low level to a high level like the source enable signal S_ON at a time point when the test frame starts, and may transition from a high level to a low level at a time point at the end of the test frame.

Figure 2:
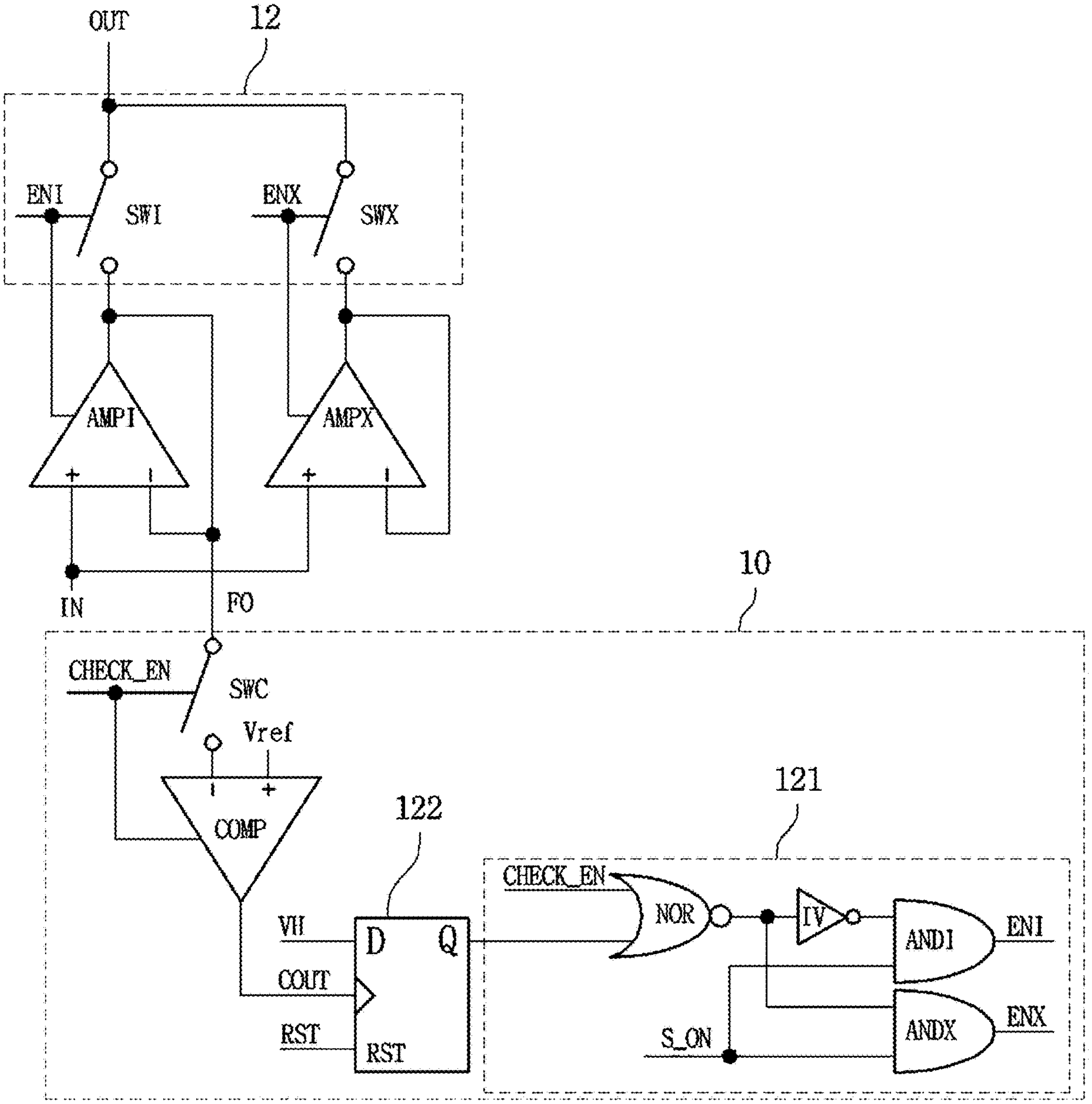
FIG. 2 is a circuit diagram illustrating the display driver of FIG. 1.

As shown in FIG. 2, the detection circuit 10 may be configured to check the failure of the output buffer AMPI by using the check signal CHECK_EN, the source enable signal S_ON and the source signal FO of the output buffer AMPI described above. To this end, the detection circuit 10 may include a check switch SWC, a comparator COMP, a failure determination unit 122, and a control circuit 121.

The check switch SWC may be switch controlled by the check signal CHECK_EN to be turned on during the test frame, and transmit the source signal FO of the output buffer AMPI to the negative terminal (−) of the comparator COMP during the test frame.

The comparator COMP may be activated during the test frame by the check signal CHECK_EN, and compare the source signal FO applied to the negative terminal (−) and a reference voltage Vref applied to the positive terminal (+) to output a comparison signal COUT. In this case, as the reference voltage Vref, a voltage maintaining a preset level between the high level and the low level of the input signal IN may be used.

When the output buffer AMPI is normal, the output buffer AMPI may output the source signal FO having the level transition corresponding to the input signal IN having the level transition as shown in FIG. 3. On the other hand, when the output buffer AMPI is out of order, the output buffer AMPI may output the source signal FO fixed to a high or low level regardless of the input signal IN having a level transition as shown in FIG. 4.

The comparator COMP may output a low-level comparison signal COUT when the source signal FO is greater than the reference voltage Vref, and output a high-level comparison signal COUT when the source signal FO is equal to or lower than the reference voltage Vref. When a level transition based on the input signal IN occurs in the source signal FO, the comparator COMP may output the comparison signal COUT to have the level transition.

That is, the comparator COMP may output the comparison signal COUT having a level transition corresponding to the source signal FO having a level transition as shown in FIG. 3, and output the comparison signal COUT maintaining a high or low level corresponding to the source signal FO having no level transition as shown in FIG. 4.

The failure determination unit 122 may provide a determination signal Q activated at the level transition time point of the comparison signal COUT as shown in FIG. 3, or provide the determination signal Q that is maintained in an inactivation state when there is no level transition in the comparison signal COUT as shown in FIG. 4. To this end, the failure determination unit 122 may be configured using a D flip-flop. In more detail, the failure determination unit 122 composed of a D flip-flop may be configured to use the comparison signal COUT, which is the output of the comparator COMP, as a clock and allow the input D to be fixed by the high-level voltage VH. In this case, a reset signal RST may be initially provided as a pulse when the input signal IN is provided at a high level after the test frame starts.

When the output buffer AMPI is normal, the failure determination unit 122 may provide the determination signal Q reset to a low level by the reset signal RST. As the input signal IN transitions from a high level to a low level as shown in FIG. 3, when the comparison signal COUT transitions from a low level to a high level, the determination signal Q activated to the high level may be output at the level transition time point.

When the output buffer AMPI is out of order, the failure determination unit 122 may receive the comparison signal COUT maintaining a high or low level as a clock as shown in FIG. 4, and since there is no level transition in the comparison signal COUT, may output a deactivated determination signal Q maintaining a low level.

The control circuit 121 is configured to output a control signal for selecting a source signal corresponding to the activated determination signal Q and to output a control signal for selecting a dummy source signal corresponding to the deactivated determination signal Q.

The switching signals ENI and ENX included in the control signal may be provided to have complementary phases. For example, in correspondence to the activated determination signal Q, the switching signal ENI may be provided at a high level and the switching signal ENX may be provided at a low level as shown in FIG. 3. On the contrary, in correspondence to the deactivated determination signal Q, the switching signal ENI may be provided at a low level and the switching signal ENX may be provided at a high level as shown in FIG. 4. As described above, the switching signal ENI may be provided to the switch SWI, and when the switching signal ENI has a high level, the switch SWI may be turned on. In addition, the switching signal ENX may be provided to the switch SWX as described above, and the switch SWX may be turned on when the switching signal ENX has a high level.

In more detail, the control circuit 121 may be configured to output a control signal for selecting a source signal by the check signal CHECK_EN that remains enabled during the test frame period. When the test frame period is over so that the check signal CHECK_EN is disabled, the control circuit 121 may be configured to output a control signal for selecting a source signal corresponding to the activated determination signal Q as shown in FIG. 3 or output a control signal for selecting a dummy source signal corresponding to the deactivated determination signal Q as shown in FIG. 4.

To this end, the control circuit 121 may be configured to include a NOR gate NOR, an inverter IV, and AND gates ANDI and ANDX.

The NOR gate NOR is configured to fix the output to a low level regardless of the determination signal Q in a state where the check signal CHECK_EN is enabled. To this end, the NOR gate NOR is configured to output a value obtained by NOR-operating the check signal CHECK_EN and the determination signal Q. The NOR gate NOR may output a value whose level is determined according to the value of the determination signal Q at the time point when the check signal CHECK_EN is switched to be disabled by the above configuration.

The inverter IV is provided for providing the inverted value of the NOR gate NOR.

In addition, the AND gate ANDI is configured to output a value obtained by AND-operating the output of the inverter IV and the source enable signal S_ON as the switching signal ENI, and the AND gate ANDX is configured to output a value obtained by AND-operating the output of the NOR gate NOR and the source enable signal S_ON as the switching signal ENX.

As described above, the determination signal Q is provided at a high level as shown in FIG. 3 when the output buffer AMPI is normal, and is provided at a low level as shown in FIG. 4 when the output buffer AMPI is out of order.

During a test frame in which the check signal CHECK_EN is enabled, the output of the NOR gate NOR is fixed low, and the output of the inverter IV is fixed high. Therefore, since the source enable signal S_ON is maintained at a high level, during the test frame, the AND gate ANDI may output the switching signal ENI of the high level, and the AND gate ANDX may output the switching signal ENX of the low level.

When the test frame ends, the check signal CHECK_EN is converted to a disabled state. Therefore, when the test frame ends, the output of the NOR gate NOR may be determined according to the determination signal Q.

That is, when the output buffer AMPI is normal so that the high level determination signal Q is provided as shown in FIG. 3, the output of the NOR gate NOR remains low, and as a result, the AND gate ANDI may maintain the switching signal ENI of the high level, and the AND gate ANDX may maintain the switching signal ENX of the low level.

Therefore, when the output buffer AMPI is normal, the switch SWI may remain turned on, and the source signal FO of the output buffer AMPI may be output as the output signal OUT. In this case, the switch SWX remains turned off.

On the contrary, when the output buffer AMPI is faulty so that the low level determination signal Q is provided as shown in FIG. 4, the output of the NOR gate NOR is converted to high, and as a result, the AND gate ANDI may output the low level switching signal ENI, and the AND gate ANDX may output the high level switching signal ENX.

Therefore, when the output buffer AMPI is out of order, the switch SWI is turned off, and the switch SWX is turned on. That is, the dummy source signal of the dummy buffer AMPX may be output as the output signal OUT.

As described above, the detection circuit 10 may provide the switching signal ENI for turning on the switch SWI and the switching signal ENX for turning off the switch SWX when there is a level transition corresponding to the input signal IN in the source signal during a preset test frame period, and may provide the switching signal ENI for turning off the switch SWI and the switching signal ENX for turning on the switch SWX when the level transition is not present in the source signal during a preset test frame period.

As a result, the embodiment may perform an output correction function of outputting the dummy source signal of the normally operating dummy buffer AMPX as the output signal of the corresponding channel instead of the faulty output buffer AMPI, so that it is possible to resolve the display failure caused by the failure of the output buffer AMPI.

Figure 5:
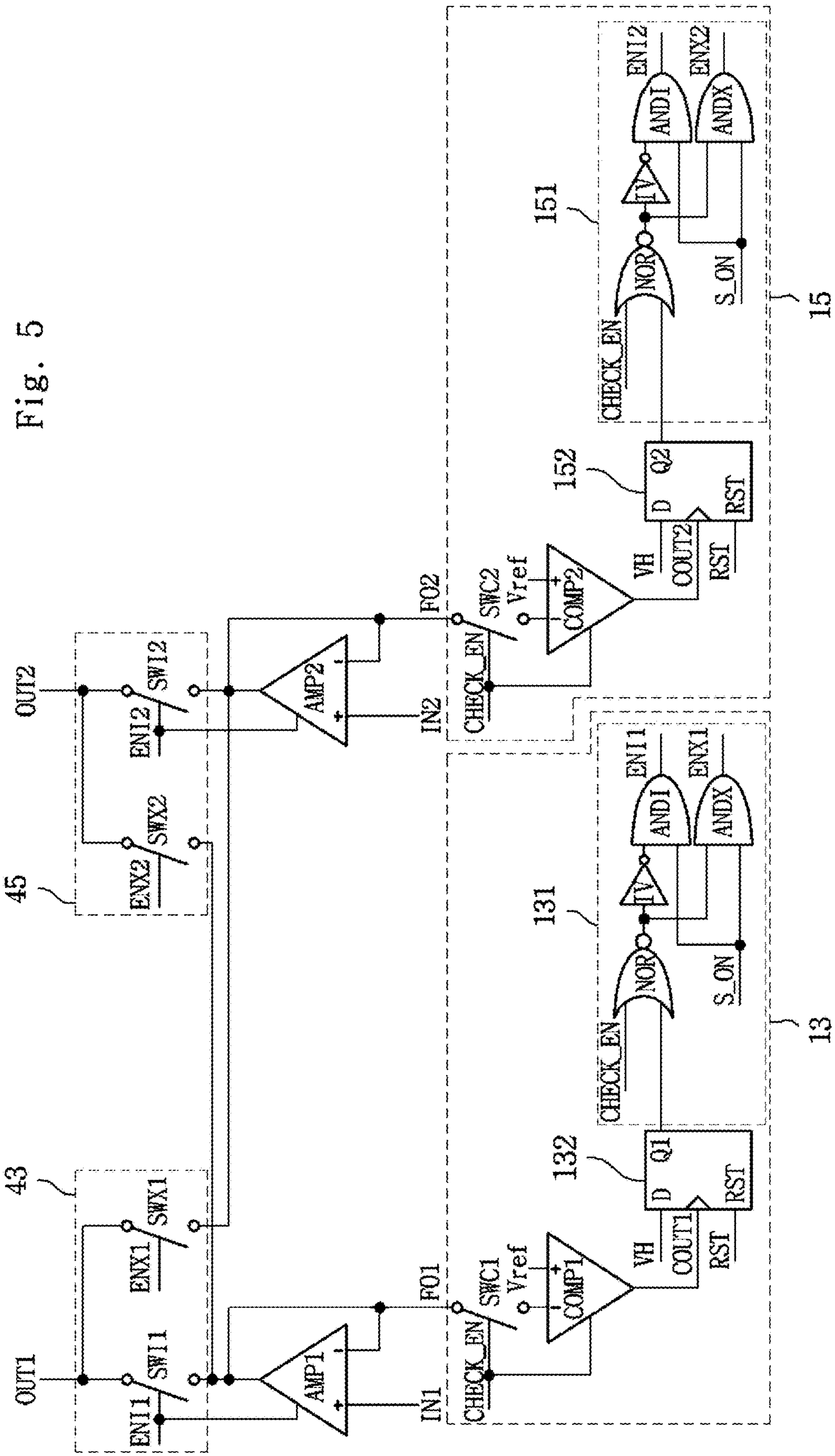
FIG. 5 is a circuit diagram illustrating a display driver having an output correction function in accordance with another embodiment.

Meanwhile, the display driver DIC according to an embodiment is configured to output the source signal by using an adjacent output buffer instead of an output buffer having a defect as shown in FIG. 5, so that it is possible to resolve the display failure caused by the failure of the output buffer.

Referring to FIG. 5, the display driver DIC may have a plurality of channels for providing the output signals OUT to the display panel DP. It may be understood that the output buffers AMP1 and AMP2 of FIG. 5 form adjacent channels. The output buffer AMP1 may be defined as outputting a first source signal corresponding to the first input signal IN1, and the output buffer AMP2 may be defined as outputting a second source signal corresponding to the second input signal IN2. For description of embodiments, it is described that the input signals IN1 and IN2 have the same phase in the test frame, but the embodiment is not limited thereto.

The output buffers AMP1 and AMP2 are each configured to output a signal obtained by comparing the input signal IN1 or IN2 and an output applied to the positive terminal (+) and the source signal applied to the negative terminal (−). The source signal of the output buffer AMP1 may be defined as FO1, and the source signal of the output buffer AMP2 may be defined as FO2.

FIG. 5 shows detection circuits 13 and 15 and switching circuits 43 and 45.

In this case, the detection circuit 13 detects a failure of the output buffer AMP1. The switching circuit 43 is configured to select the source signal FO1 of the output buffer AMP1 as the output signal OUT1 when the output buffer AMP1 is normal, and select the source signal FO2 of the output buffer AMP2 as the output signal OUT1 corresponding to the output buffer AMP1 when the output buffer AMP1 is faulty.

In addition, the detection circuit 15 detects a failure of the output buffer AMP2. The switching circuit 45 is configured to select the source signal FO2 of the output buffer AMP2 as the output signal OUT2 when the output buffer AMP2 is normal, and select the source signal FO1 of the output buffer AMP1 as the output signal OUT2 corresponding to the output buffer AMP2 when the output buffer AMP2 is faulty.

In FIG. 5, the configuration and operation of the detection circuit 13 for detecting the failure of the output buffer AMP1 and the detection circuit 15 for detecting the failure of the output buffer AMP2 may be understood with reference to the detection circuit 10 in FIGS. 1 and 2.

The detection circuit 13 including a check switch SWC1, a comparator COMP1, a failure determination unit 132 and a control circuit 131 is exemplified, and the detection circuit 15 including a check switch SWC2, a comparator COMP2, a failure determination unit 152, and a control circuit 151 is exemplified.

The detailed configurations and operations of the detection circuits 13 and 15 are the same as those of the detection circuit 10 of FIG. 1, so the duplicated descriptions of the configuration and operation will be omitted. However, the detection circuits 13 and 15 differ from the detection circuit 10 of FIGS. 1 and 2 in that the detection circuit 13 outputs the switching signals ENI1 and ENX1 as control signals and the detection circuit 15 outputs the switching signals ENI2 and ENX2 as the control signals.

Meanwhile, the switching circuit 43 includes two switches SWI1 and SWX1, and the configuration of the switching circuit 45 including two switches SWI2 and SWX2 is the same as that of the switching circuit 12 of FIG. 1 including two switches SWI and SWX.

However, the switches SWX1 and SWX2 differ from the switch SWX of the switching circuit 12 of FIG. 1 in the facts that the switch SWX1 is configured to select the source signal FO2 of the output buffer AMP2 adjacent to the output buffer AMP1 as the output signal OUT1, and the switch SWX2 is configured to select the source signal FO1 of the output buffer AMP1 adjacent to the output buffer AMP2 as the output signal OUT2.

That is, unlike the embodiment of FIG. 1, it may be understood that the embodiment of FIG. 5 is implemented to select the source signal FO2 of the output buffer AMP2 of the adjacent channel instead of the source signal FO1 and output it as the output signal OUT1 when the output buffer AMP1 is out of order, so that it is possible to resolve the display failure caused by the defect of the output buffer AMP1, and implemented to select the source signal FO1 of the output buffer AMP1 of the adjacent channel instead of the source signal FO2 and output it as the output signal OUT2 when the output buffer AMP2 is out of order, so that it is possible to resolve the display failure caused by the defect of the output buffer AMP2.

Figure 6:
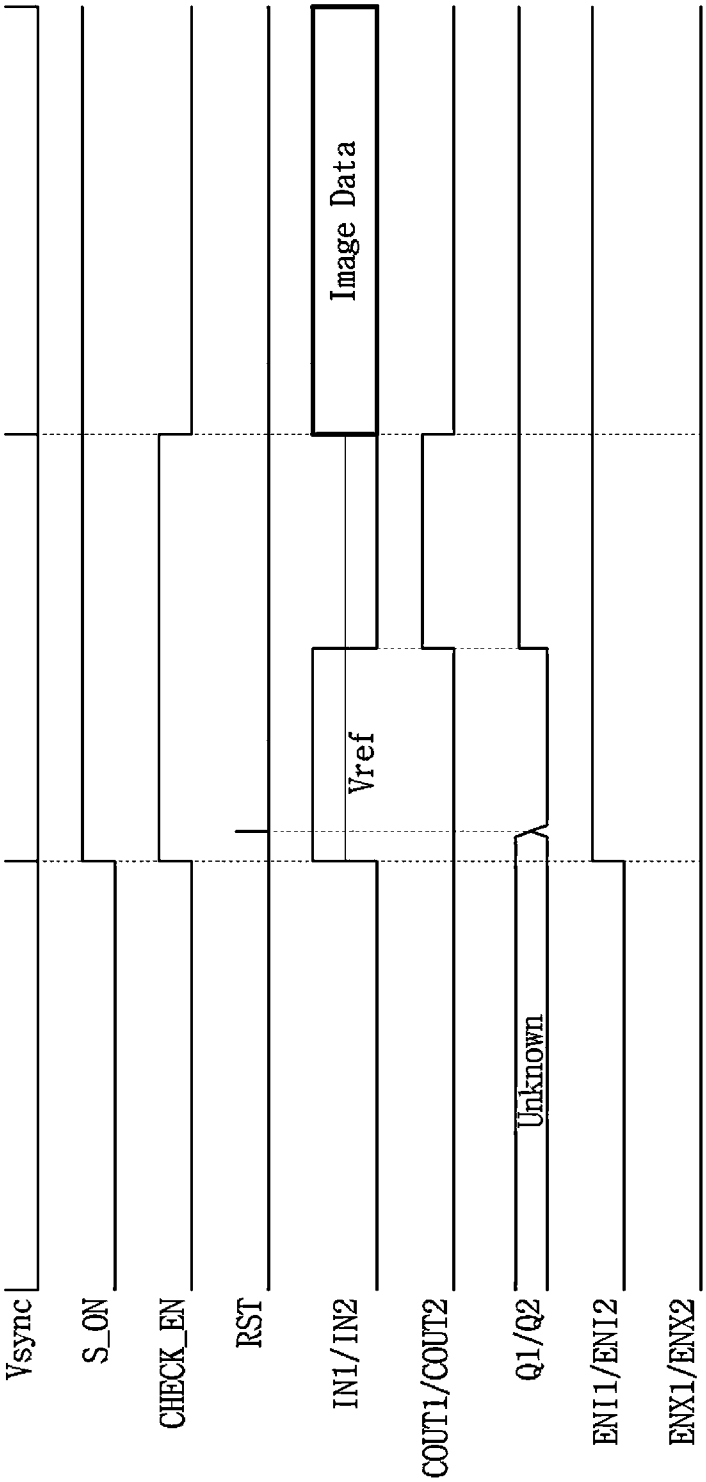
FIG. 6 is a timing chart illustrating an operation corresponding to a test frame when the output buffers of FIG. 5 are normal.

Referring to FIG. 6, when all of the output buffers AMP1 and AMP2 are normal, the comparison signals COUT1 and COUT2 output from the comparators COMP1 and COMP2 may have level transitions corresponding to the level transitions of the input signals IN1 and IN2 in the test frame, respectively. In addition, the determination signals Q1 and Q2 of the failure determination units 132 and 152 may be set to a high level from a time point when the levels of the comparison signals COUT1 and COUT2 transition to a high level after being set to a low level by a reset signal RST.

Therefore, the detection circuits 13 and 15 do not change the levels of the switching signals ENI1 and ENX1 and the levels of the switching signals ENI2 and ENX2 even when the check signal CHECK_EN transitions to the low level after the test frame ends. That is, since both of the output buffers AMP1 and AMP2 are normal, the source signal FO1 of the output buffer AMP1 is output through the switch SWI1 as the output signal OUT1, and the source signal FO2 of the output buffer AMP2 is output through the switch SWI2 as the output signal OUT2.

Figure 7:
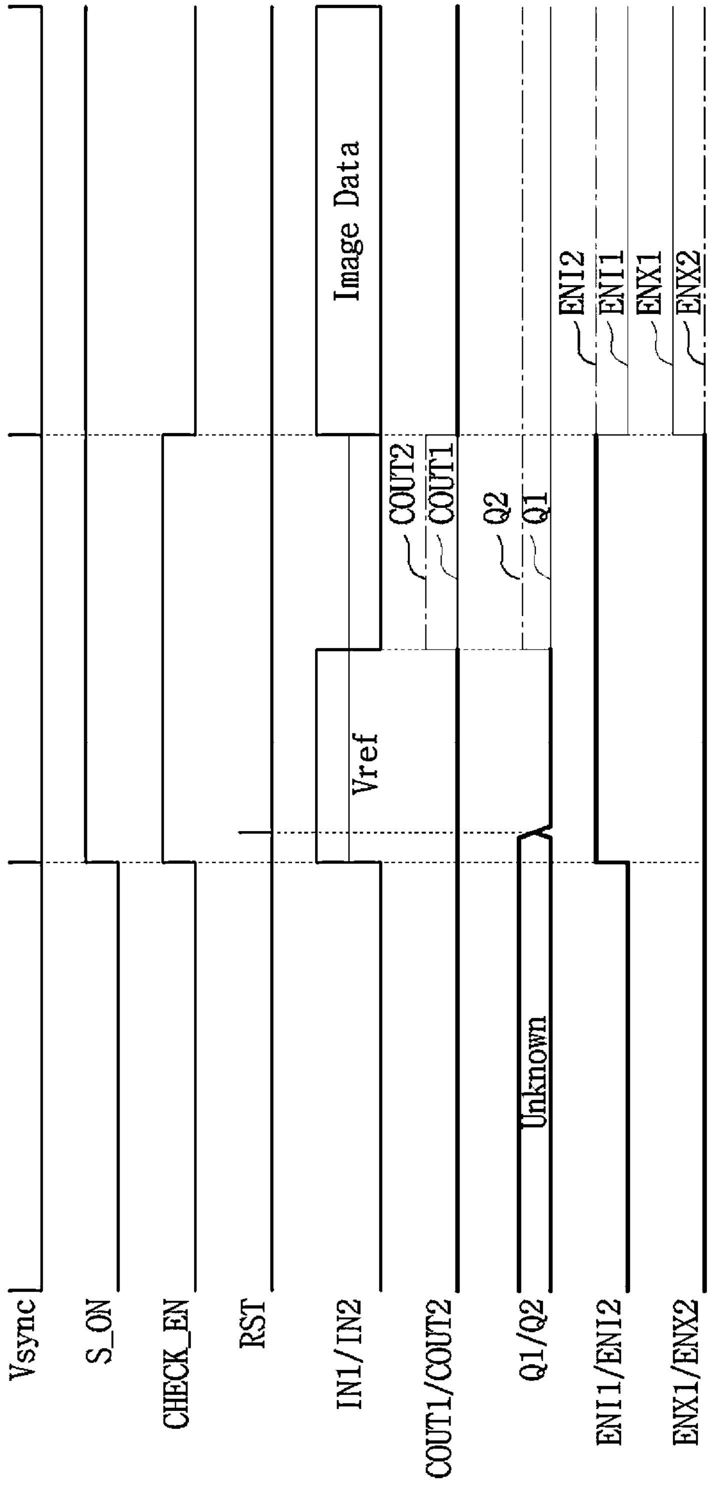
FIG. 7 is a timing chart illustrating an operation corresponding to a test frame when one of the output buffers of FIG. 5 is out of order.

However, when one of the output buffers AMP1 and AMP2 is out of order, the defective output buffer may output the source signal of an output buffer of an adjacent channel as an output signal. FIG. 7 is a timing chart illustrating a case in which the output buffer AMP1 fails for the purpose of explaining the embodiment of the present invention.

When the output buffer AMP1 is out of order, the comparator COMP1 may output a comparison signal COUT1 that maintains high or low without a level transition in correspondence to the input signal IN1, and the failure determination unit 132 may maintain the reset low-level determination signal Q1. Therefore, the control circuit 131 may output the low-level switching signal ENI1 and the high-level switching signal ENX1 at a time point when the check signal CHECK_EN transitions to low.

Therefore, when the output buffer AMP1 is faulty, the switch SWI1 is turned off and the switch SWX1 is turned on. That is, the source signal FO2 of the output buffer AMP2 may be output as the output signal OUT1.

In this case, since the output buffer AMP2 is normal, the switch SWI2 is turned on and the switch SWX2 is turned off, so that the source signal FO2 of the output buffer AMP2 may be output as the output signal OUT2.

According to the embodiments of FIGS. 5 to 7, the output correction function may be performed by using an output buffer of an adjacent channel that operates normally instead of a defective output buffer, so that it is possible to resolve display failure caused by the failure of the output buffer.

In addition, according to the embodiments of FIGS. 5 to 7, it is possible to reduce the circuit design size by using the output buffer of the channel adjacent to the defective output buffer.

Figure 8:
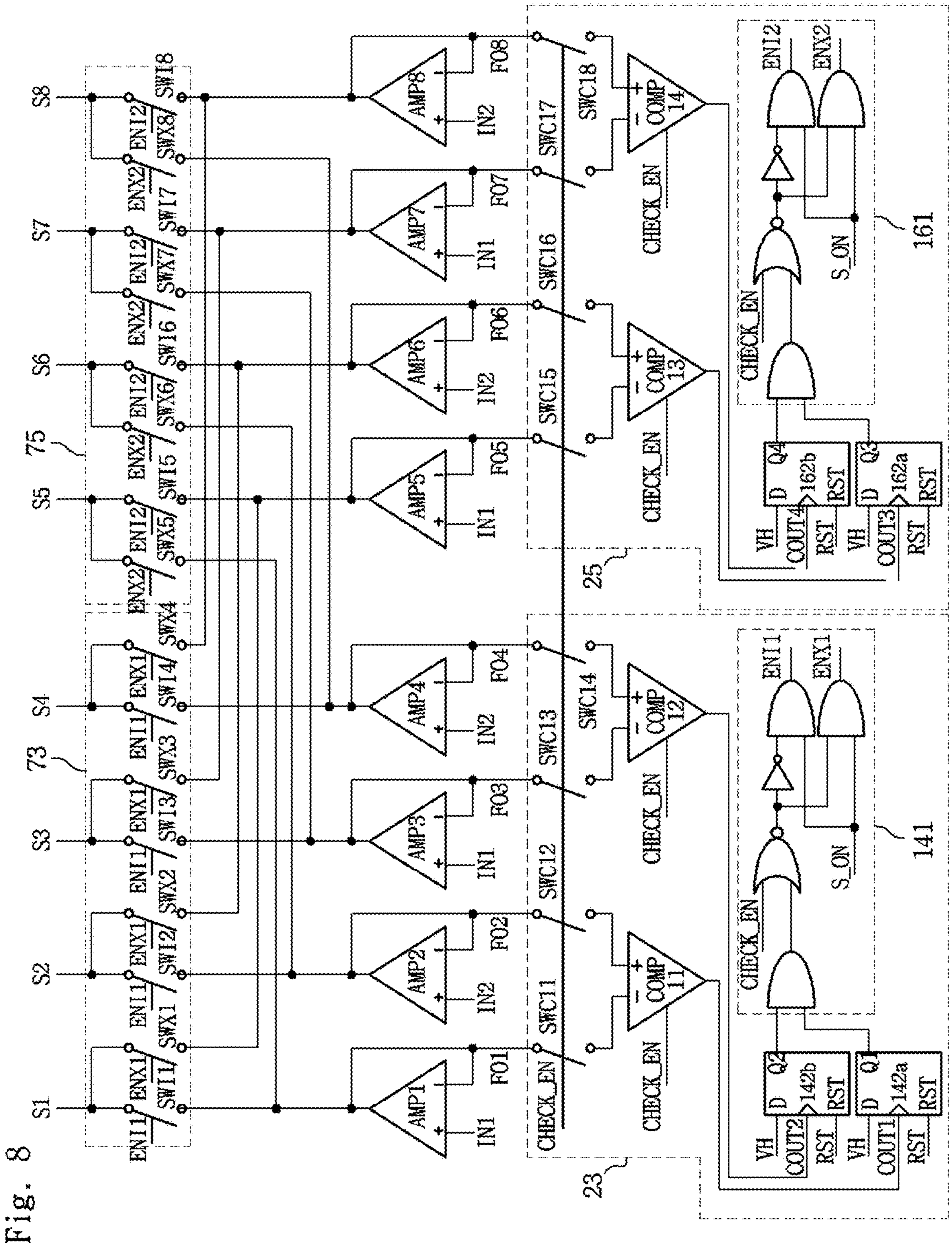
FIG. 8 is a circuit diagram illustrating a display driver having an output correction function in accordance with still another embodiment.

Meanwhile, as shown in FIG. 8, the display driver DIC according to an embodiment is configured to output the source signals by using a group of adjacent output buffers instead of the group of defective output buffers, so that it is possible to resolve the display failure caused by the failure of the output buffer.

Referring to FIG. 8, the display driver DIC may have a plurality of channels divided into a first group and a second group, and output buffers may be configured for each channel.

As an example, the output buffers AMP1 to AMP4 may be classified into the first group, and the same number of output buffers AMP5 to AMP8 as the output buffers AMP1 to AMP4 may be classified into the second group.

Input signals IN1 and IN2 having level transitions of a complementary phase during a test frame period may be input to adjacent output buffers in the group. For example, among the adjacent output buffers AMP1 and AMP2 included in the first group, the input signal IN1 is input to the output buffer AMP1 and the input signal IN2 is input to the output buffer AMP2. As may be seen with reference to FIG. 9, it may be understood that the input signals IN1 and IN2 have level transitions at the same time point during the test frame period and have opposite phases. Meanwhile, the source signals output from the output buffers AMP1 to AMP8 may be defined as FO1 to FO8.

The embodiment of FIG. 8 may include detection circuits 23 and 25 and switching circuits 73 and 75.

In this case, the detection circuit 23 may provide a control signal by detecting the states of the source signals FO1 to FO4 of the output buffers AMP1 to AMP4 of the first group, and the control signal of the detection circuit 23 may include switching signals ENI1 and ENX1. Then, the switching circuit 73 may select one of the first and second groups by the switching signals ENI1 and ENX1 that are the control signals of the detection circuit 23, and output the source signals of the output buffers of the selected group as output signals S1 to S4 corresponding to output buffers AMP1 to AMP4 of the first group.

In addition, the detection circuit 25 may provide a control signal by detecting the states of the source signals FO5 to FO8 of the output buffers AMP5 to AMP8 of the second group, and the control signal of the detection circuit 25 may include switching signals ENI2 and ENX2. Then, the switching circuit 75 may select one of the first and second groups by the switching signals ENI2 and ENX2 that are the control signals of the detection circuit 25, and output the source signals of the selected group as the output signals S5 to S8 corresponding to the output buffers AMP5 to AMP8 of the second group.

First, the detection circuit 23 may provide the switching signals ENI1 and ENX1 that are control signals by comparing the source signals of a pair of adjacent output buffers of the first group during the first frame in which the output of the source signals FO1 to FO4 of the output buffers AMP1 to AMP4 is activated, that is, a test frame.

The switching signals ENI1 and ENX1, which are control signals, are provided to select the source signals of one of the first and second groups as the output signals S1 to S4.

The detection circuit 23 detects that the output buffers AMP1 to AMP4 are normal when level transitions are in all the source signals FO1 to FO4 of the first group. In this case, the detection circuit 23 may provide the switching signals ENI1 and ENX1 for selecting the source signals FO1 to FO4 of the first group as the output signals S1 to S4.

In addition, the detection circuit 23 detects that one of the output buffers AMP1 to AMP4 belonging to the first group is defective when there is no level transition in at least one of the source signals FO1 to FO4 of the first group. In this case, the detection circuit 23 may provide the switching signals ENI1 and ENX1 for selecting the source signals FO5 to FO8 of the second group as the output signals S1 to S4.

To this end, the detection circuit 23 may be configured to include check switches SWC11 to SWC14, comparators COMP11 and COMP12, failure determination units 142*a* and 142*b*, and a control circuit 141.

The check switches SWC11 to SWC14 may be configured to receive the source signals FO1 to FO4 of the output buffers AMP1 to AMP4 of first group one-to-one, and may be turned on during the test frame period by the check signal CHECK_EN so that the source signals FO1 to FO4 may be transmitted to the comparators COMP11 and COMP12 by turning on.

The comparators COMP11 and COMP12 may operate during the test frame period under control of the check signal CHECK_EN. In addition, the comparators COMP11 and COMP12 are configured to output comparison signals obtained by comparing the source signals of a pair of adjacent output buffers transmitted through the check switches SWC11 to SWC14 during the test frame period, respectively.

Figure 9:
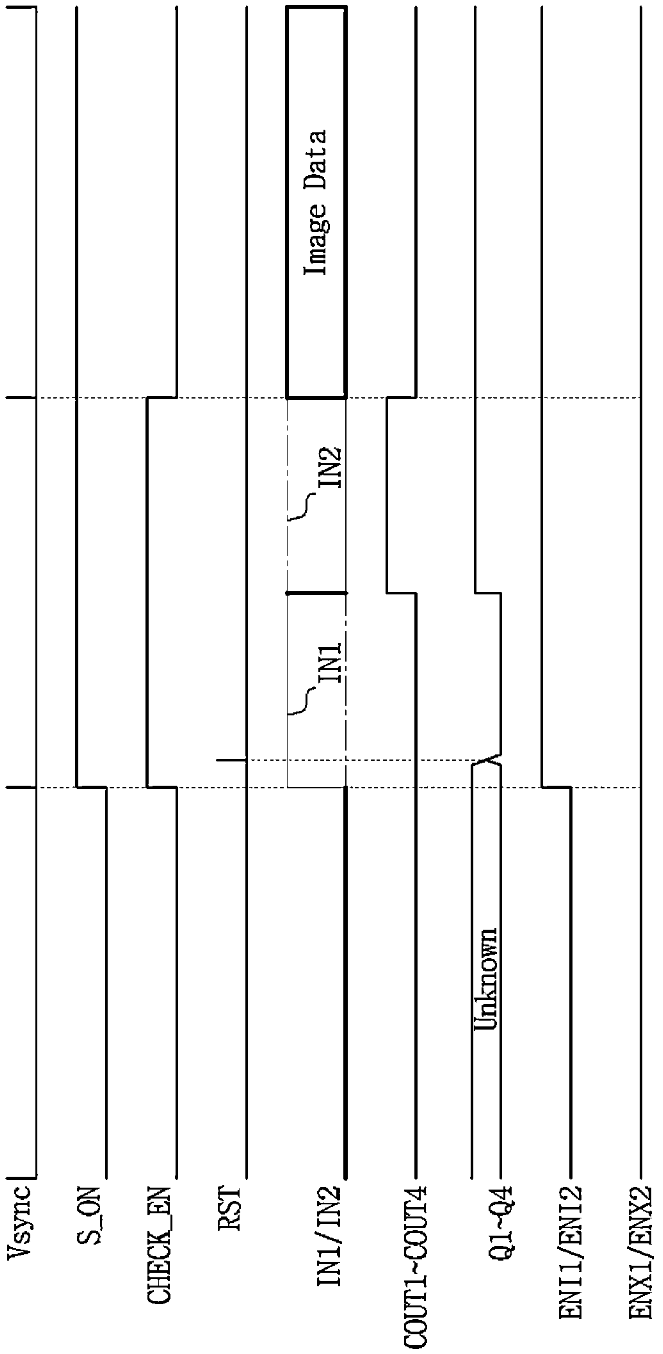
FIG. 9 is a timing chart illustrating an operation corresponding to a test frame when the output buffers of FIG. 8 are normal.

As shown in FIG. 9, a pair of adjacent output buffers AMP1 to AMP4 may receive input signals IN1 and IN2 having a level transition of a complementary phase during a preset test frame period. For example, the output buffers AMP1 and AMP3 may receive the input signal IN1, and the output buffers AMP2 and AMP4 may receive the input signal IN2 having a level transition of a complementary phase to the input signal IN1.

Accordingly, the comparator COMP11 may receive the source signals FO1 and FO2 of the output buffers AMP1 and AMP2 of the adjacent channel through the check switches SWC11 and SWC12 during the test frame. In this case, the source signal FO1 may be input to the negative terminal (−) of the output buffer AMP1, and the source signal FO2 may be input to the positive terminal (+) of the output buffer AMP1.

In addition, the comparator COMP12 may receive the source signals FO3 and FO4 of the output buffers AMP3 and AMP4 of the adjacent channel through the check switches SWC13 and SWC14 during the test frame. In this case, the source signal FO3 may be input to the negative terminal (−) of the output buffer AMP2, and the source signal FO4 may be input to the positive terminal (+) of the output buffer AMP4.

When the output buffers AMP1 to AMP4 are normal, the source signals FO1 and FO3 may have a phase transitioning from a low level to a high level in the same manner as the input signal IN1 during the test frame, and the source signals FO2 and FO4 may have a phase transitioning from a high level to a low level during the test frame in the same manner as the input signal IN2.

Therefore, as shown in FIG. 9, the comparator COMP11 may output, to the failure determination unit 142*a*, the comparison signal COUT1 having a level transition from low to high during the test frame when the output buffers AMP1 and AMP2 are normal, and the comparator COMP12 may also output, to the failure determination unit 142*b*, the comparison signal COUT2 having a level transition from low to high during the test frame when the output buffers AMP3 and AMP4 are normal.

When at least one of the output buffers AMP1 to AMP4 is out of order, at least one of the source signals FO1 to FO4 may maintain a low or high level during the test frame.

Figure 10:
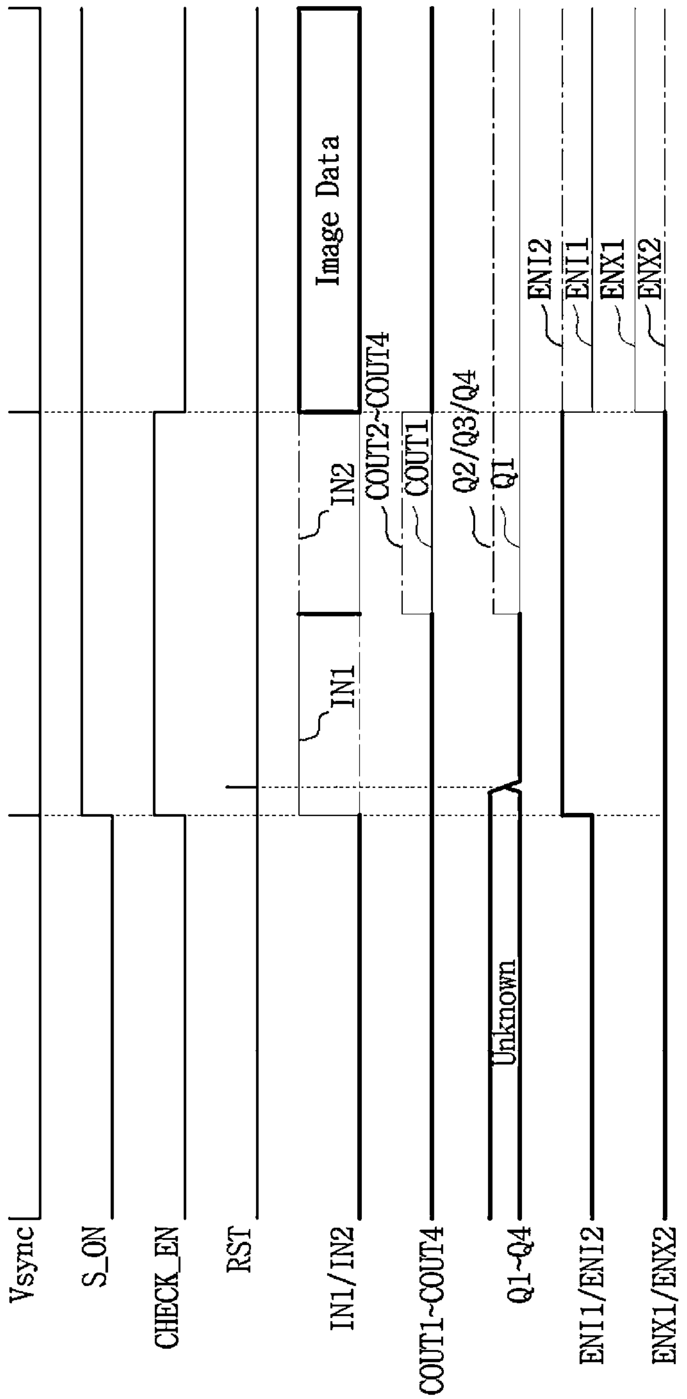
FIG. 10 is a timing chart illustrating an operation corresponding to a test frame when an output buffer of one group of FIG. 8 is out of order.

Therefore, as shown in FIG. 10, when at least one of the output buffers AMP1 and AMP2 is out of order, the comparator COMP11 may output, to the failure determination unit 142*a*, the comparison signal COUT1 that maintains low or high during the test frame. FIG. 10 illustrates that the comparison signal COUT1 maintains low. Even when at least one of the output buffers AMP3 and AMP4 is out of order, although not illustrated in FIG. 10, the comparator COMP12 may output, to the failure determination unit 142*b*, the comparison signal COUT2 that maintains low or high during the test frame.

The failure determination units 142*a* and 142*b* are configured to correspond to the comparators COMP11 and COMP12, respectively. The failure determination unit 142*a* is configured to provide an activated determination signal Q1 when there is a level transition in the comparison signal COUT1, and to provide a deactivated determination signal Q1 when there is no level transition in the comparison signal COUT1. The failure determination unit 142*b* is configured to provide an activated determination signal Q2 when there is a level transition in the comparison signal COUT2 and to provide a deactivated determination signal Q2 when there is no level transition in the comparison signal COUT2. FIG. 10 illustrates that there is no level transition in the comparison signal COUT1 so that the deactivated determination signal Q1 is provided.

When the determination signals Q1 and Q2 of the failure determination units 142*a* and 142*b* are all activated at the time point when the check signal CHECK_EN is deactivated as shown in FIG. 9, the control circuit 141 outputs a control signal for selecting the source signals FO1 to FO4 of the first group. On the contrary, when at least one of the determination signals Q1 and Q2 of the failure determination units 142*a* and 142*b* is in an inactive state at the time point when the check signal CHECK_EN is deactivated as shown in FIG. 10, the control circuit 141 outputs a control signal for selecting the source signals FO5 to FO8 of the second group.

The control circuit 141 may include the switching signals ENI1 and ENX1 as described above. To select the source signals FO1 to FO4 of the first group, the switching signal ENI1 is activated to a high level and the switching signal ENX1 is deactivated to a low level. To select the source signals FO5 to FO8 of the second group, the switching signal ENI1 is deactivated to a low level and the switching signal ENX1 is activated to a high level.

The switching circuit 73 includes switches ENI1 to ENI4 and switches ENX1 to ENX4. Switching of the switches ENI1 to ENI4 is controlled by the switching signal ENI1, and switching of the switches ENX1 to ENX4 is controlled by the switching signal ENX1.

In this case, the switches ENI1 and ENX1 are provided to select the output signal S1, where the switch ENI1 is configured to receive the source signal FO1 of the output buffer AMP1, and the switch ENX1 is configured to receive the source signal FO5 of the output buffer AMPS. The switches ENI2 and ENX2 are provided to select the output signal S2, where the switch ENI2 is configured to receive the source signal FO2 of the output buffer AMP2, and the switch ENX2 is configured to receive the source signal FO6 of the output buffer AMP6. The switches ENI3 and ENX3 are provided to select the output signal S3, where the switch ENI3 is configured to receive the source signal FO3 of the output buffer AMP3, and the switch ENX3 is configured to receive the source signal FO7 of the output buffer AMP7. The switches ENI4 and ENX4 are provided to select the output signal S4, where the switch ENI4 is configured to receive the source signal FO4 of the output buffer AMP4, and the switch ENX4 is configured to receive the source signal FO8 of the output buffer AMP8.

As shown in FIG. 9, when all the output buffers AMP1 to AMP4 are normal, the source signals FO1 to FO4 of the output buffers AMP1 to AMP4 of the first group may be output as the output signals S1 to S4. To this end, the switches ENI1 to ENI4 are turned on by activation of the switching signal ENI1.

However, when one of the output buffers AMP1 to AMP4 is out of order as shown in FIG. 10, that is, when there is no level transition in at least one source signal, the source signals FO5 to FO8 of the output buffers AMP5 to AMP8 of the second group may be output as the output signals S1 to S4. To this end, the switches ENX1 to ENX4 are turned on by activation of the switching signal ENX1.

Meanwhile, the detection circuit 25 may include check switches SWC15 to SWC18, comparators COMP13 and COMP14, failure determination units 162*a* and 162*b*, and a control circuit 161.

As described above, the detection circuit 25 provides a control signal that is, switching signals ENI2 and ENX2 by detecting the states of the source signals FO5 to FO8 of the output buffers AMP5 to AMP8 of the second group.

Since the configuration and operation of the detection circuit 25 can be understood with reference to the detection circuit 23, the detailed description thereof will be omitted.

The switching signals ENI2 and ENX2, which are control signals provided by the detection circuit 25, are provided to select the source signals of one of the first and second groups as the output signals S5 to S8. The switching signal ENI2 is activated to a high level to select the source signals FO5 to FO8 of the second group, and the switching signal ENX2 is activated to a high level to select the source signals F01 to F04 of the first group.

The switching circuit 75 includes switches ENI5 to ENI8 and switches ENX5 to ENX8. Switching of the switches ENI5 to ENI8 is controlled by the switching signal ENI2, and switching of the switches ENX5 to ENX8 is controlled by the switching signal ENX2.

In this case, the switches ENI5, ENX5 are provided to select the output signal S5, where the switch ENI5 is configured to receive the source signal FO5 of the output buffer AMP5, and the switch ENX5 is configured to receive the source signal FO1 of the output buffer AMP1. The switches ENI6, ENX6 are provided to select the output signal S6, where the switch ENI6 is configured to receive the source signal FO6 of the output buffer AMP6, and the switch ENX6 is configured to receive the source signal FO2 of the output buffer AMP2. The switches ENI7 and ENX7 are provided to select the output signal S7, where the switch ENI7 is configured to receive the source signal FO7 of the output buffer AMP7, and the switch ENX7 is configured to receive the source signal FO3 of the output buffer AMP3. The switches ENI8 and ENX8 are provided to select the output signal S8, where the switch ENI8 is configured to receive the source signal FO8 of the output buffer AMP8, and the switch ENX8 is configured to receive the source signal FO4 of the output buffer AMP4.

When all the output buffers AMP5 to AMP8 are normal, the source signals FO5 to FO8 of the output buffers AMP5 to AMP8 of the second group may be output as the output signals S5 to S8. To this end, the switches ENI5 to ENI8 are turned on by activation of the switching signal ENI2.

However, when one of the output buffers AMP5 to AMP8 is out of order, that is, when there is no level transition in at least one source signal, the source signals FO1 to FO4 of the output buffers AMP1 to AMP4 of the first group may be output as the output signals S5 to S8. To this end, the switches ENX5 to ENX8 are turned on by the activation of the switching signal ENX2.

According to the embodiments, as described with reference to FIGS. 8 to 10, source signals may be output by using a group of adjacent output buffers instead of a group of output buffers which are out of order, so that it is possible to resolve the display failure caused by the failure of the output buffer.

Therefore, according to the embodiments, it is possible to improve the reliability of the display driver and the display system using the same.

What is claimed is:

1. A display driver comprising:

an output buffer configured to output a source signal corresponding to an input signal;

a dummy buffer configured to output a dummy source signal corresponding to the input signal;

a detection circuit configured to provide a control signal by detecting a state of the source signal; and a switching circuit configured to select one of the source signal and the dummy source signal according to the control signal and output a selected signal as an output signal, wherein the detection circuit is configured to select the source signal in response to a check signal that remains enabled during a preset test frame period and output the control signal when the check signal is disabled due to expiration of the preset test frame period.

2. The display driver according to claim 1, wherein the output buffer receives the input signal having a level transition in a first frame in which an output of the source signal is activated, and wherein the detection circuit provides the control signal for selecting the source signal when a level transition is in the source signal, and provides the control signal for selecting the dummy source signal when the level transition is not in the source signal.

3. The display driver according to claim 1, wherein the detection circuit includes:

a comparator configured to receive the source signal corresponding to the input signal having a level transition during the preset test frame period and output a comparison signal obtained by comparing the source signal with a preset reference voltage;

a failure determination unit configured to provide an activated determination signal at a level transition time point of the comparison signal, and provide a deactivated determination signal when a level transition is not in the comparison signal; and a control circuit configured to output the control signal for selecting the source signal in response to the activated determination signal and output the control signal for selecting the dummy source signal in response to the deactivated determination signal.

4. The display driver according to claim 3, wherein the control circuit is configured to:

output the control signal for selecting the source signal in response to a check signal that remains enabled during the test frame period; and when the check signal is disabled due to expiration of the test frame period, output the control signal for selecting the source signal in response to the activated determination signal, or output the control signal for selecting the dummy source signal in response to the deactivated determination signal.

5. The display driver according to claim 3, further comprising:

a check switch that is turned on by a check signal that remains enabled during the test frame period and transmits the source signal to the comparator.

6. The display driver according to claim 1, wherein the switching circuit includes:

a first switch configured to switch to output the source signal as the output signal according to a first switching signal included in the control signal; and a second switch configured to switch to output the dummy source signal as the output signal according to a second switching signal included in the control signal, and wherein the detection circuit provides the first switching signal for turning on the first switch and the second switching signal for turning off the second switch when the source signal has a level transition corresponding to the input signal during a preset test frame period, and provides the first switching signal for turning off the first switch and the second switching signal for turning on the second switch when the level transition is not in the source signal during the preset test frame period.

* * * * *